United States Patent
Renfroe et al.

(10) Patent No.: US 6,709,013 B2
(45) Date of Patent: Mar. 23, 2004

(54) LAND VEHICLE WITH LEVER STEERING

(75) Inventors: David A. Renfroe, Fayetteville, AR (US); Joe Partain, Fayetteville, AR (US)

(73) Assignee: University of Arkansas, Little Rock, AR (US)

( * ) Notice: Subject to any disclaimer, the term of this patent is extended or adjusted under 35 U.S.C. 154(b) by 70 days.

(21) Appl. No.: 10/103,389

(22) Filed: Mar. 20, 2002

(65) Prior Publication Data

US 2002/0135174 A1 Sep. 26, 2002

Related U.S. Application Data

(60) Provisional application No. 60/277,773, filed on Mar. 21, 2001.

(51) Int. Cl.$^7$ .................................................. B62D 1/12
(52) U.S. Cl. ..................... 280/778; 280/93.506; 280/269
(58) Field of Search .................................. 280/778, 263, 280/267, 269, 93.502, 93.504, 93.506, 93.507; 180/332, 408, 409

(56) References Cited

U.S. PATENT DOCUMENTS

| | | | | |
|---|---|---|---|---|
| 2,618,447 A | * | 11/1952 | Lecarme | 244/231 |
| 2,757,014 A | | 7/1956 | Schmitz | 280/87 |
| 4,006,664 A | | 2/1977 | Brown | 91/171 |
| 4,162,859 A | * | 7/1979 | McAfee | 403/75 |
| 4,986,387 A | | 1/1991 | Thompson et al. | 180/212 |
| 5,090,512 A | | 2/1992 | Mullet et al. | 180/236 |
| 5,094,312 A | | 3/1992 | Hakel | 180/132 |
| 5,653,304 A | * | 8/1997 | Renfroe | 180/402 |
| 5,806,622 A | * | 9/1998 | Murphy | 180/210 |
| 5,893,426 A | | 4/1999 | Shimizu et al. | 180/400 |
| 5,931,244 A | | 8/1999 | Renfroe et al. | 180/6.32 |
| 6,402,174 B1 | * | 6/2002 | Maurer | 280/267 |
| 6,434,917 B1 | * | 8/2002 | Bartel | 56/11.3 |
| 6,554,087 B2 | * | 4/2003 | Huntsberger et al. | 180/65.1 |

* cited by examiner

*Primary Examiner*—David R. Dunn
(74) *Attorney, Agent, or Firm*—Robert R. Keegan; Keisling Piepeu & Scott

(57) ABSTRACT

There is disclosed lever steering apparatus for a land vehicle with steerable and independently suspended front wheels having left and right steering levers at the driver position. The left and right steering levers are coupled by lever mechanisms and an elongated rod to move in opposite directions. Left and right fore and aft links extend from the left and right steering levers to the left and right front wheels to transmit steering motion displacement to the steerable front wheels causing rotation of the axles of the wheels about a vertical axis. A controller arm connected to each wheel stub axles is connected to the forward end of a fore and aft link for steering motion of a front wheel. The control arm fore and aft link combination causes each wheel steering motion to have a predetermined relation to motion of the corresponding link.

8 Claims, 3 Drawing Sheets

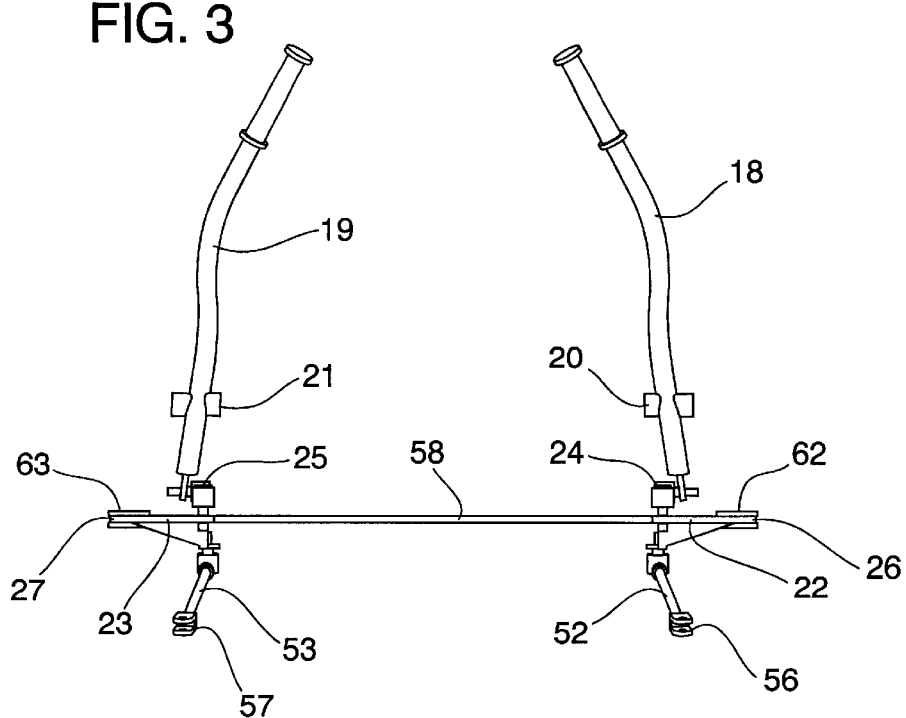
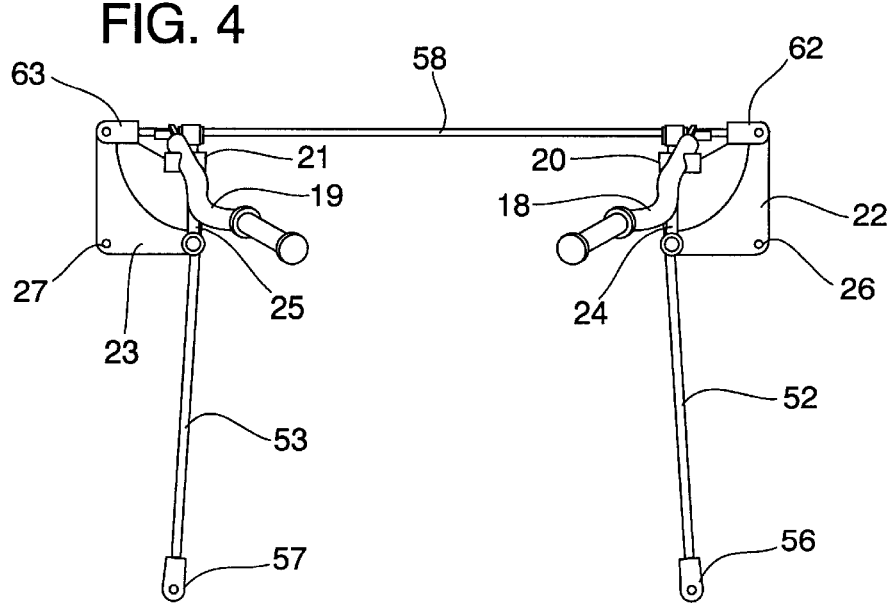

LAND VEHICLE WITH LEVER STEERING

CROSS-REFERENCE TO RELATED APPLICATIONS

This application claims priority from provisional application serial No. 60/277,773, filed Mar. 21, 2001.

STATEMENT REGARDING FEDERALLY SPONSORED RESEARCH OR DEVELOPMENT

Not applicable.

BACKGROUND OF THE INVENTION

The present invention relates to steering systems for wheeled vehicles, particularly road or all terrain vehicles with at least two steerable wheels under manual control of a driver using lever steering and in which at least the steerable wheels are independently suspended from the vehicle body frame.

The structure, adjustment, and alignment of the steering mechanism of a wheeled vehicle is a somewhat complicated matter involving various relationships of each steerable wheel axle to the vehicle body referred to as caster, camber, toe-in, Ackerman angle and the like. No attempt is made here to present a detailed discussion of all these factors, except as they relate to the improvements of the present invention.

For over a century, the steering system for automotive vehicles has utilized a front axle which does not rotate about a vertical axis when the vehicle is steered to the right or the left. Rather, each front wheel is provided with a stub axle which is rotatable about a vertically disposed king-pin or equivalent pivotal mounting structure. Accordingly, it is necessary to provide means by which the front wheels turn to the left or turn to the right together in a coordinated fashion. It was long ago determined that optimum steering was not achieved with strictly parallel motion of the front wheels because the outwardly turning wheel is closer to the vehicle turning center than the inwardly turning wheel and needs to rotate through a greater angle. This refinement and provision for steering control is referred to as the Ackerman angle provision.

A common and conventional wheeled vehicle steering system provides for the rotation of the steering column or steering shaft to be converted into linear motion of a link which imparts a rotating motion to the stub axle of a wheel through a steering control arm extending from the stub axle. The common means for providing coordinated motion of the two steerable wheels includes a track arm which is fixed with respect to the stub axle on each wheel together with a track rod extending between the two track arms so that the two front wheels are constrained to move (track) in a predetermined relationship either to the right or to the left. In most cases, the linkage provided does not maintain the wheels parallel but rather provides respective non-linear turning relationships which take into account the Ackerman angle provision. As mentioned above, the present invention eliminates reliance upon a track rod or other direct mechanical linkage between the left and right steerable wheels by causing the turning motion of each wheel to be effected by its own independent (left or right) steering motion controller link.

Steering systems for wheeled vehicles have been proposed in prior patents which employ independent right and left steering motion controllers, in the form of hydraulic cylinders, for example, but such known steering systems have commonly provided direct wheel coordination with track rods or equivalent means between the left side and the right side wheel.

U.S. Pat. No. 5,094,312 to Hakel dated Mar. 10, 1992 shows a vehicle steering system in which the left and right steering control arms for the front wheels are both operated by a single double-acting hydraulic piston with oppositely directed piston rods each coupled by a mechanical link to a respective steering control arm. This single piston arrangement is in effect a direct mechanical linkage from the left side wheel to the right side wheel (there are not two independent hydraulic cylinders for the respective left and right steerable wheels). U.S. Pat. No. 4,986,387 to Thompson, et al., dated Jan. 2, 1991 shows a steerable wheeled vehicle with a steerable wheel for which turning motion is provided by hydraulic cylinder and a rack and pinion, but, since there is only one steerable wheel, it provides no teaching with respect to coordination of two steerable wheels relevant to the present invention.

U.S. Pat. No. 5,090,512 to Mullet, et al., dated Feb. 25, 1992 relies on a mechanical connection from a left side cable unit to a right side cable unit of the steering system to produce the non-linear relation for wheel steering; wheel steering angle is directly proportional to cable motion at each wheel. U.S. Pat. No. 4,006,664 to Brown dated Feb. 8, 1977 has hydraulic operated steering, but like the patent to Hakel has only a single cylinder for left and right wheels, the coordinated motion of which must be provided by a linkage directly connecting left and right wheels with the single cylinder provided for their operation.

A cable-type steering device is shown in U.S. Pat. No. 5,893,426 to Shimizu, et al., dated Apr. 13, 1999 wherein flexible push-pull cables from a steering wheel control a power steering motor and a track bar which interconnects both front wheels.

U.S. Pat. No. 2,757,014 to Schmitz dated Jul. 31, 1956 discloses a steering system for a tractor having pairs of control cylinders and operating cylinders for providing steering motion to the respective front wheels which is independently controlled, there being no tie-rod connecting to the two front wheels. Although the independent control of the two front wheels is arranged so that there is a non-linear relationship between the steering motion of the left wheel and the right wheel, this non-linear relationship is not for the purpose of providing a desired Ackerman angle relationship in the steering mechanism, but, rather, is to facilitate very sharp turning of the tractor vehicle about either the left rear wheel or the right rear wheel. Accordingly, the stated objective of the steering system is solely to arrive at an extreme or limit position for the wheels in which the left wheel is turned by ninety degrees and the right wheel is turned by about fifty degrees (or vice versa). No Ackerman angle is sought or achieved for modest steering movement motions and, as the description states, any normal steering movement of the wheel 24 will be transmitted to the wheels 13 and 14 equally. Other features of the Schmitz disclosure make it unsuitable for an all-terrain vehicle or road vehicle; note that the front wheels of the vehicle are not independently suspended and there is no suggestion that it could be modified for inclusion in a vehicle with independent suspension for the steerable wheels.

U.S. Pat. No. 5,931,244 to Renfroe, et al., dated Aug. 1, 1999 discloses a cable steering system which does not include the structure and function of the simple conventional steerable wheel control arm, and uses a complex actuator for each steerable wheel; the U.S. Pat. No. 5,931,244 disclosure also requires that the Ackerman angle relation for wheel angles be provided without contribution from a control arm and its associated linkage. Some general considerations regarding lever steering from the U.S. Pat. No. 5,931,244 patent are applicable here and that patent accordingly is incorporated by reference.

SUMMARY OF THE INVENTION

The steering system of the present invention provides lever steering which eliminates the necessity of a steering wheel. The control of the vehicle may be accomplished with either hand or both hands. The double handle configuration of the preferred embodiment gives the operator a sense similar to using motorcycle handle bars except the center section of the handle bars is not present and the levers pivot more fore and aft. This also allows entry and exit to the vehicle through the front of the vehicle if desired, and it removes the danger of the steering wheel and the necessary support structure upon which a person may be injured and impaled in the event of accidents. This then allows increased ride-down distance which can be incorporated into the vehicle restraint system to reduce injuries.

By the present invention, the necessary forces for causing each of the steerable wheels to properly respond to the steering control provided by the driver is effectuated between the vehicle body and each (usually independently suspended) steerable wheel control arm by a steering motion controller and motion displacement transferring elements, preferably in the form of two fore and aft rigid steering links. The coordination of the left wheel and right wheel motion is attained, not with the usual mechanical link between steering control arms for the wheels, but rather by steering motion displacements transmitted to the actuators and to the wheels from the corresponding steering lever. These motions imparted to the wheels by the respective actuators have a predetermined non-linear relation, preferably produced by a non-linear coupling of the actuators and control arms combined. An advantage of the system of the invention is that the necessity for a conventional steering column is eliminated along with the safety hazard that such columns present for the driver in the event of a mishap. Another advantage is that it facilitates a very large vertical travel for the independent suspension. This is especially appropriate when each suspension arm pivots about an axis at least somewhat crosswise of the vehicle (as in U.S. Pat. No. 5,931,244).

The Ackerman steering in the preferred embodiment is accomplished with the angular relationships of a steering motion displacement link, control arm, and steering pivot. The customary lever linkage to convert linear motion to rotational motion of the wheel about the vertical king pin pivot axis is preferably modified for receiving fore and aft motion displacement rather than right-left displacement from the track. The designer is free to set parameters of these wheel steering elements to optimize suspension travel and to prevent bump steer. As another option, one may replace the rigid links structure with a flexible cable linkage performing the same or essentially the same functions. Cables could extend fore and aft to each wheel.

In addition to providing the features and advantages described above, it is an object of the present invention to provide a wheeled vehicle steering system which achieves coordination between the steering motion of the left and right wheels by providing independently actuated steering motion transmitting elements to each of the wheels, the motions of which are coordinated through the mechanical systems thereof, thereby avoiding the necessity of a track bar or other mechanical linkage extending between the right side and left side wheels of the vehicle while providing advantages of lever steering.

BRIEF DESCRIPTION OF THE SEVERAL VIEWS OF THE DRAWINGS

In addition to the objects and advantages described above, other objects and advantages of the invention will be apparent from consideration of the following description in conjunction with the drawings in which:

FIG. 3 is an elevational view of the apparatus of FIG. 2;

FIG. 4 is a plan view of the apparatus of FIG. 2; and

DETAILED DESCRIPTION OF THE INVENTION

Figure 1:
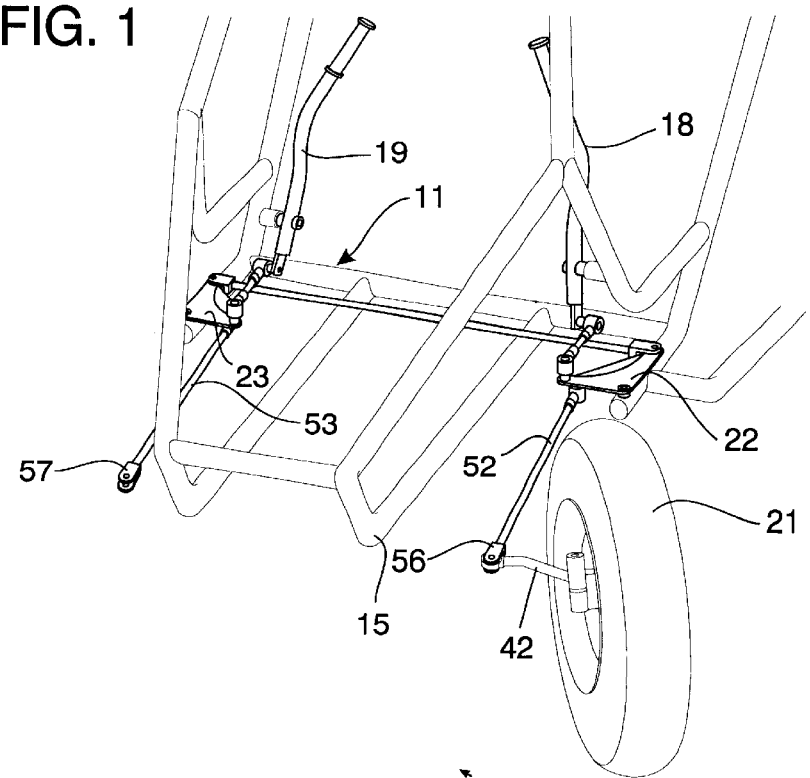
FIG. 1 is a partially fragmentary and schematic perspective view showing a lever steering system for a vehicle according to the invention.

Referring now to the drawings, and particularly FIGS. 1 through 5, a lever steered vehicle is shown schematically in FIG. 1. A preferred embodiment of the invention is more clearly shown in FIGS. 2 through 4. As shown in FIG. 1, the vehicle 11 has a frame 15, seat for a driver position (not shown), and four wheels (only wheel 21 being shown), and all of which are generally conventional.

The suspension for the wheels may be similar to the form shown in U.S. Pat. No. 5,931,244 or any known or conventional form and is not shown in detail. The engine system, lights, brake system, controls and instruments may be of any known or conventional form and are not shown or described in detail.

It should be noted that the lever steering according to the invention may be employed with independent suspension with outrigger suspension arms with pivotal mountings having an axis generally parallel to the longitudinal axis of the vehicle, i.e., the direction of travel. Preferably, the front wheel suspension is a fore and aft suspension system wherein the suspension arms extend forwardly from a pivotal axis generally crosswise of the vehicle and are themselves generally parallel to the direction of vehicle motion (as shown in U.S. Pat. No. 5,931,244).

The mounting for front wheels conventionally comprises a pin which is approximately vertical having pivotally mounted thereon a stub axle on which wheel 21 is mounted. Steering control arms 42 are pivoted commonly with stub axles for wheels 21 so that wheel stub axle and control arm pivot together through the same cycle.

Figure 2:
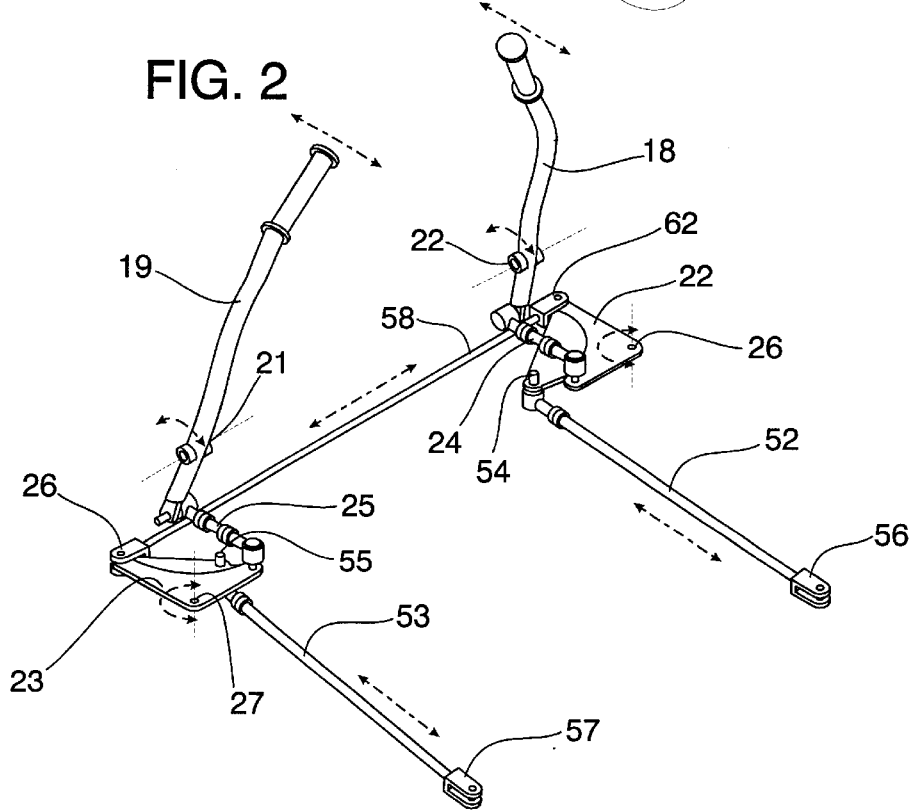
FIG. 2 is a fragmentary perspective view showing the relation of the left and right lever steering apparatus of FIG. 1.
Figure 5:
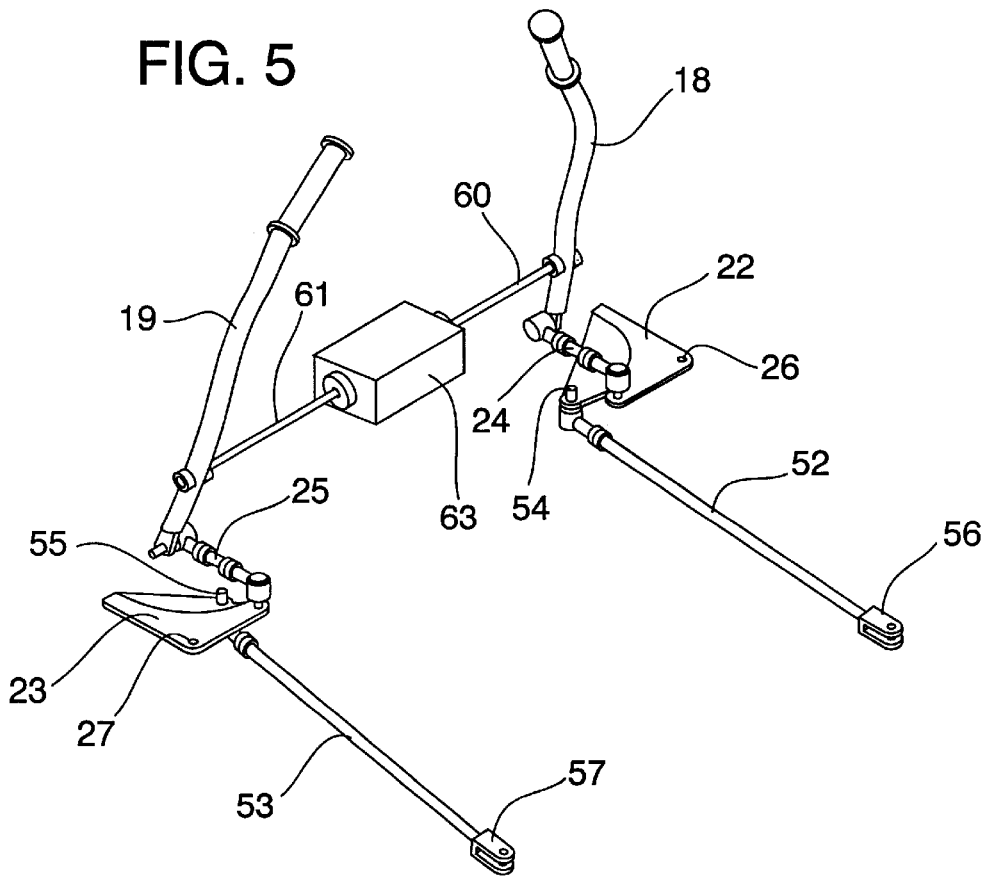
FIG. 5 is a perspective view of an alternative embodiment of the apparatus of FIGS. 1 through 4 similar except that a reversing gear mechanism constrains the levers to opposite directions of motion.

Referring again to the drawings and particularly to FIGS. 2, 3, and 4, and the relevant portions of FIG. 5, it will be noted that steering levers 18 and 19 are generally upright, but curved and slanted inwardly between ten and thirty degrees at the top portion to optimize the ergonomic relation with respect to the driver's hands and arms. The curvature of levers 18 and 19 is primarily above the pivot points 20 and 21 where the levers are secured to the frame 15. If desired, levers 18 and 19 may be curved forward or backward to obtain the desirable angular relationships in the overall lever steering linkage.

Levers 18 and 19 are pivotally connected respectively at their lower ends to adjustable links 24 and 25 linking modules 22 and 23. Linking modules 22 and 23 are mounted pivotally to the vehicle frame at pivot points 26 and 27. Thus, it will be seen that forward and rearward pivoting of handles 18 and 19 about the horizontal axes of pivots 20 and 21 causes rotation about a generally vertical axis of link modules 22 and 23 about their respective pivot points 26 and 27.

Link module 22 and link module 23 serving as steering motion controllers are interconnected (as shown in FIGS. 2, 3, and 4) by a tie rod 58 having at its ends yoke 62 and 63 for pivotal connection with link module 22 and link module 23.

From the configuration thus far described, it will be seen that steering lever 18 is constrained to move forward when steering lever 19 moves rearward and vice versa. Furthermore, link modules 22 and 23 rotate about their pivots 26 and 27 in opposite directions in response to motion of steering lever 18 or steering level 19. The motion of link modules 22 and 23 may be approximately linearly related (although opposite). It may be preferred that non-linearity introduced by non-linear relative motion of link modules 22 and 23 (resulting from prescribed design configuration) will provide a favorable overall result in achieving the desired Ackerman angular relations in the tracking of the front wheels of the vehicle.

Link bars 52 and 53 are pivotally connected at their rear ends to pivot joints 54 and 55 on link modules 22 and 23 and are thereby caused to move fore and aft therewith.

At their forward ends, link bars 52 and 53 are provided with yokes 56 and 57 for pivotally connecting left and right link bars 52 and 53 with left and right steering control arms respectively. Once the steering lever control linkage is completed, steering levers 18 and 19 respectively control the steering angle of the left and right front wheels. Link bars 52 and 53 thus serve as motion displacement links from levers 18 and 19 to yokes 56 and 57, which couple through link modules 22 and 23 to left steering control arm 42 and right steering control arm (not shown).

As previously discussed, the proper Ackerman relationship of the steering angles of the front wheels requires that there be a non-linear relationship in the aforesaid steering angles so that the inside wheel in a certain arcuate vehicle path be turned a greater angle than the outside wheel. Traditionally, this Ackerman relationship has been approximated by conventional known design of the relation between front steering control arms and a track rod extending across the front of the vehicle between the control arms of the left and right wheels. An essentially similar mechanical design approach is appropriate with the lever steering system of the invention notwithstanding the fact that the motion of the operative link bars 52 and 53 is fore and aft, whereas the motion of the conventional track rod is left to right. It can be seen that rotating the linkage of the prior conventional track rod arrangement by ninety degrees will essentially obtain the same result in conjunction with the fore and aft link rods 52 and 53. This assumes that the motion of link bars 52 and 53 is equal and opposite and introduces no non-linearity. To the extent that non-linearity may be introduced by unequal or non-linear motions of link bars 52 and 53, this provides an opportunity for even closer approximation to the Ackerman angle relationship.

Referring now to FIG. 5, the structure and operation of the alternative embodiment shown is similar in structure and function to that shown in FIGS. 1–4 except that the mechanism for constraining steering levers 18 and 19 to opposite directions of motion involving tie rod 58 has been replaced by shafts 60 and 61 which are secured to steering levers 18 and 19 for rotational motion therewith and a reversing gearbox of conventional form schematically indicated at 63. Thus, axles 60 and 61, together with reversing gearbox 63 provide the linkage to cause levers 18 and 19 to move in opposite directions and thus indirectly assure tracking of the vehicle front wheels without use of the conventional track rod extending between the front wheels of the vehicle. Note that in this embodiment one of the steering levers may be positioned near the center of a two seat vehicle placing the levers adjacent an off center driver's seat.

It should be noted that the principles of the present invention could also be applied to a wide range of vehicles including those with six or more wheels (including half-track vehicles), those with steerable wheels at the rear in addition to those at the front, and to vehicles with various kinds of suspension systems different from those described.

It will be appreciated that in addition to this substitution of the mechanism of FIG. 5 for that of FIGS. 1 through 4 in respect to causing the desired relationship between motion of steering lever 18 and steering lever 19 other substitutions for the specific mechanisms shown would be apparent to those skilled in the art. It should further be noted that modifications could be made in the link bar steering force transmission arrangement described and illustrated. For example, double flexible cable arrangements for both the left and right side could replace the rigid link bars. Particularly in the FIG. 5 embodiment, the fore and aft moving link bars 52 and 53 may be functionally replaced with rotatable shafts operating individual rack and pinion steering units at respective front wheels.

Whereas the present invention has been described in relation to the drawings attached hereto, it should be understood that other and further modifications, apart from those shown or suggested herein, may be made within the spirit and scope of this invention, and, accordingly, the scope of the invention is not to be deemed limited to those embodiments described and illustrated, but is, rather, to be determined by reference to the appended claims.

In summary, the present steering apparatus for a land vehicle with steerable and independently suspended front wheels has a left steering lever and a right steering lever positioned at the sides of the driver position. The left and right steering levers are coupled by a lever mechanism and an elongated rod extending therebetween to be restrained to move in opposite directions. Left and right fore and aft links extend from the left and right steering levers forward to the left and right front wheels serving to transmit steering motion displacement to respective ones of the steerable front wheels in a conventional manner by causing rotation and motion of the axles of the wheels about a generally vertical axis; the position of each of the wheels is substantially unaffected by vertical displacement of the independent suspension as a result of the configuration of the fore and aft links. Typically a conventional controller arm connected to each of the wheels stub axles is connected to the forward end of a fore and aft link to complete the transmission of steering motion displacement to a front wheel. The control arm fore and aft link combination causes each wheel steering in motion to have a predetermined nonlinear relation to motion of the corresponding link. Driver movement of each steering lever or both steering levers in opposite directions causes immediate steering motion of each wheel in a predetermined desired relationship and precise steering control is maintained despite wide swings of the vehicle's wheel suspensions.

What is claimed is:

1. In a land vehicle with steerable, and independently suspended left and right front wheels, a lever steering apparatus comprising: a left steering lever; a right steering lever; means for coupling said steering levers to cause the motions thereof to be in opposite directions, said land vehicle including a driver position, said left steering lever hems at the left side of said driver position and said right steering lever being at the right side of said driver position; a left steering motion controller and a right steering motion controller, said left steering motion controller being connected to said left steering lever and said right steering motion controller being connected to said right steering lever; a pair of motion displacement links for transmitting each said steering motion displacement to said left and right front wheels; one of said pair of motion displacement links being connected to said left steering motion controller to act as a left motion displacement link; another of said pair of motion displacement links being connected to said right steering motion controller to form a right motion displacement link; said left motion displacement link being in the form of a rigid elongated member extending from said left steering motion controller to the left front wheel for steering control thereof; said right motion displacement link being in the form of a rigid elongated member extending from said right steering motion controller to the right front wheel for steering control thereof; a control arm for receiving steering motion displacements connected to each respective one of said wheels to provide steering motion thereof about a generally vertical axis, each said control arm having a respective one of said motion displacement links coupled thereto in a manner to cause each wheel steering angular motion to have a predetermined non-linear relation to motion of said link; each of said steering levers being mounted in said vehicle to permit physical movement of said steering levers about an axis which is substantially horizontal and transverse to the vehicle's central axis; each said steering motion controller being connected and arranged to cause pivotal motion of said steering levers forward and backward to be translated into substantially longitudinal forward and backward motion for respective motion displacement link; whereby movement by a driver of each of said steering levers or both of said steering levers in opposite directions causes immediate steering motions of each of said steerable wheels which steering motions are coordinated to be in the seame direction with a predetermined non-linear relation while precise steering control is maintained despite wide swings of the vehicle's wheel suspensions.

2. Apparatus as recited in claim 1 wherein said means for coupling said steering levers to cause the motions thereof to be in opposite directions comprises a rigid elongated member connected at one end to said left steering motion controller and connected at the other end to said right steering motion controller.

3. In a land vehicle with steerable, and independently suspended left and right front wheels, a lever steering apparatus comprising; a left steering lever; a right steering lever; means for coupling said steering levers to cause the motions thereof to be in opposite directions; said means for coupling said steering levers to cause the motions thereof to be in opposite directions comprising a rigid elongated member connected at one end to said left steering motion controller and connected at the other end to said right steering motion controller; said land vehicle including a driver position, said left steering lever being at the left side of said driver position and said right steering lever being at the right side of said driver position; a left steering motion controller and a right steering motion controller, said left steering motion controller being connected to said left steering lever and said right steering motion controller being connected to said right steering lever; a pair of motion displacement links for transmitting each said steering motion displacement to said left and right front wheels; one of said pair of motion displacement links being connected to said left steering motion controller to form a left motion displacement link; another of said pair of motion displacement links being connected to said right steering motion controller to form a right motion displacement link; said left motion displacement link being in the form of a rigid elongated member extending from said left steering motion controller to the left front wheel for steering control thereof; said right motion displacement link being in the form of a rigid elongated member extending from said right steering motion controller to the right front wheel for steering control thereof; a control arm for receiving steering motion displacements connected to each respective one of said wheels to provide steering motion thereof about a generally vertical axis, each said control arm having a respective one of said motion displacement links coupled thereto in a manner to cause each wheel steering angular motion to have as predetermined non-linear relation to motion of said link; whereby movement by a driver of each of said steering levers or both of said steering levers in opposite directions causes immediate steering motions of each of said steerable wheels, which steering motions are coordinated to be in the same direction with a predetermined non-linear relation while precise steering control is maintained despite wide swings of the vehicle's wheel suspensions.

4. In a land vehicle with steerable, and independently suspended left and right front wheels, a lever steering apparatus comprising: a left steering lever; a right steering lever; means for coupling said steering levers to cause the motions thereof to be in opposite directions: said land vehicle including a driver position and said left steering lever being at the left side of said driver position and said right steering lever being at the right side of said driver position: a left steering motion controller and a right steering motion controller responsive to at least one of said steering levers to produce left and right steering motion displacements; left and right motion displacement links connected respectively to said left and right steering motion controllers for transmitting said left and right steering motion displacement to said left and right front wheels respectively: a left and a right control arm for receiving steering motion displacements connected to each of said left and right front wheels to provide steering motion thereof about a generally vertical axis, each said motion displacement link being an elongated rigid member connected at one end to be moved by a respective one of said motion controllers and connected at the other end to move a respective one of said left or right control arms, each said control arm having one of said left or right motion displacement links coupled thereto in a manner to cause each wheel steering angular motion to have a predetermined relation to motion of said link; whereby movement by a driver of each of said steering levers or both of said steering levers in opposite directions causes immediate steering motions of each of said steerable wheels which steering motions are coordinated to be in the same direction with a predetermined relation.

5. Apparatus as recited in claim 4 wherein said means for coupling said steering levers to cause the motions thereof to be in opposite directions comprises a rigid elongated member connected at one end to said left steering motion controller and connected at the other end to said right steering motion controller.

6. Apparatus as recited in claim 4 wherein the top portion of each of said steering levers is curved and slanted inwardly between ten and thirty degrees.

7. In a land vehicle with steerable, and independently suspended left and right front wheels, a lever steering apparatus comprising: a left steering lever; a right steering lever; means for coupling said steering levers to cause the motions thereof to be in opposite directions wherein each of said steering levers is mounted in said vehicle to permit physical movement of said steering levers about an axis which is substantially horizontal and transverse to the vehicle's central axis; a left steering motion controller and a right steering motion controller to produce left and right steering motion displacements, said left steering motion controller being connected to said left steering lever and said right steering motion controller being connected to said right steering lever; left and right motion displacement links connected respectively to said left and right steering motion controllers for transmitting said left and right steering motion displacement to said left and right front wheels respectively; said left motion displacement link being connected to said left steering motion controller; said right motion displacement link being connected to said right steering motion controller; said left motion displacement link being in the form of a rigid elongated member extending from said left steering motion controller to the left front wheel for steering control thereof; said right motion displacement link being in the form of a rigid elongated member extending from said right steering motion controller to the right front wheel for steering control thereof; each said steering motion controller being connected and arranged to cause pivotal motion of said steering levers forward and backward to be translated into substantially longitudinal forward and backward motion of respective motion displacement links; a left and a right control arm for receiving steering motion displacements connected to each of said left and right front wheels to provide steering motion thereof about a generally vertical axis, each said control arm having one of said left or right motion displacement links coupled thereto in a manner to cause each wheel steering angular motion to have a predetermined relation to motion of said link; whereby movement by a driver of each of said steering levers or both of said steering levers in opposite directions causes immediate steering motions of each of said steerable wheels, which steering motions are coordinated to be in the same direction with a predetermined relation.

8. Apparatus as recited in claim 7 wherein said means for coupling said steering levers to cause the motions thereof to be in apposite directions comprises a rigid elongated member connected at one end to said left steering motion controller and connected at the other end to said right steering motion controller.

\* \* \* \* \*